United States Patent [19]

Pitchford

[11] Patent Number: 5,636,697

[45] Date of Patent: Jun. 10, 1997

[54] TOOL FOR CLEANING THE HOOVES OF THE EQUINE SPECIES AND METHOD OF USE

[76] Inventor: Nancy Pitchford, 21652 Spice Ct., Saugus, Calif. 91350

[21] Appl. No.: 515,853

[22] Filed: Aug. 16, 1995

[51] Int. Cl.⁶ ................................................. A01L 15/00
[52] U.S. Cl. ........................................................ 168/48.1
[58] Field of Search ................................. 168/45, 48.1

[56] References Cited

U.S. PATENT DOCUMENTS

| | | | |
|---|---|---|---|
| 544,540 | 8/1895 | Jones | 168/48.1 X |
| 547,703 | 10/1895 | Wilbanks | 168/48.1 |
| 567,493 | 9/1896 | Me Cartea | 168/48.1 X |
| 5,168,935 | 12/1992 | Thornbury et al. | 168/48.1 |

*Primary Examiner*—Robert P. Swiatek
*Attorney, Agent, or Firm*—Ted Masters

[57] ABSTRACT

A tool 20 for cleaning the hooves 500 of the equine species includes an elongated flattened handle 22 sized to be grasped by a human hand. A pick member 30 is integral with one end of handle 22, and a blade member 32 is integral with the other end. Pick member 30 includes end portion 46 having shovel-shaped indentation 48 which acts as a miniature shovel in the removal of packed debris. Blade member 32 includes a hook 60 which is useful in removing debris from small crevices in hoof 500 and also from in between hoof 500 and horseshoe 600.

8 Claims, 5 Drawing Sheets

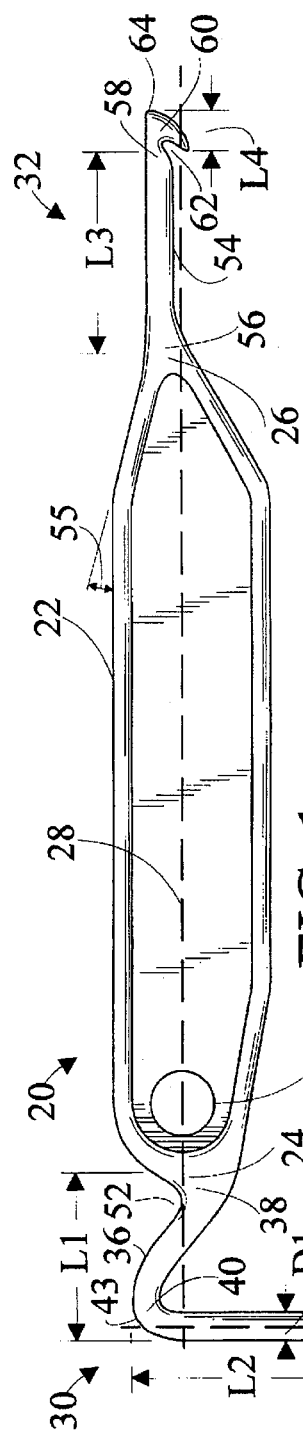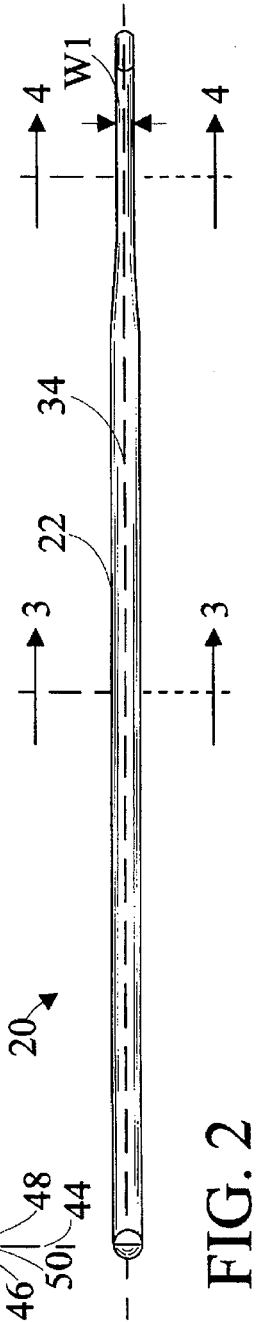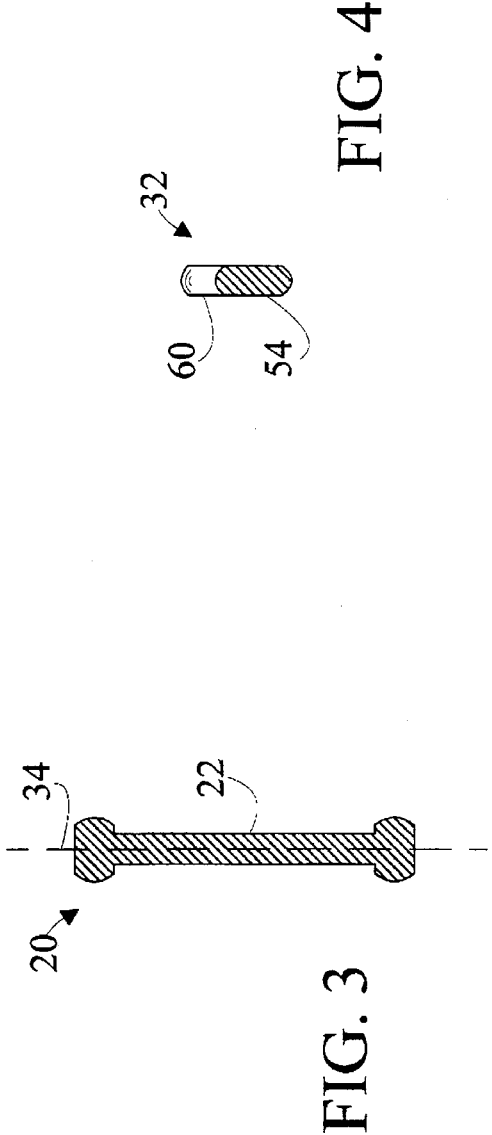
FIG. 1
FIG. 2
FIG. 3
FIG. 4

FIG. 10
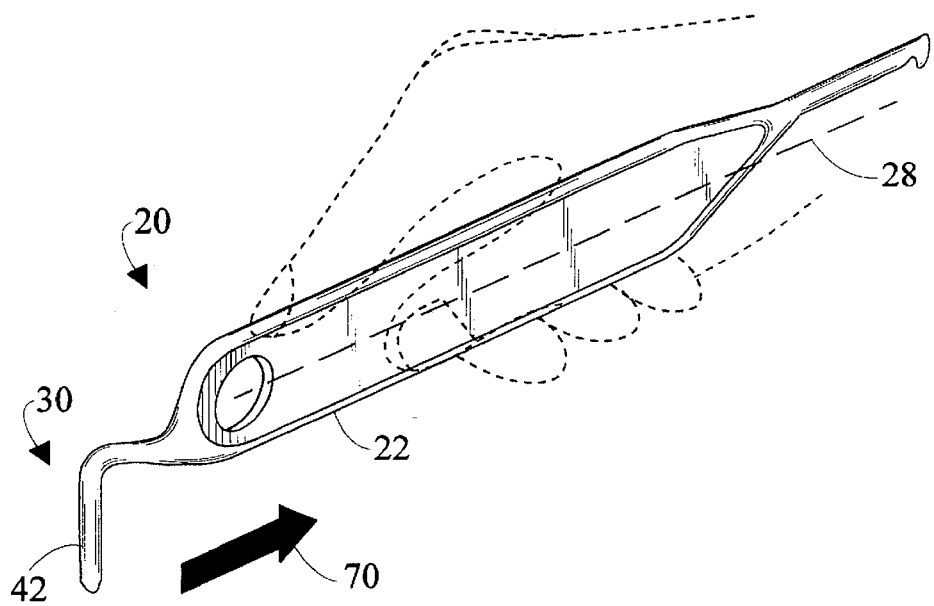
FIG. 11
FIG. 12
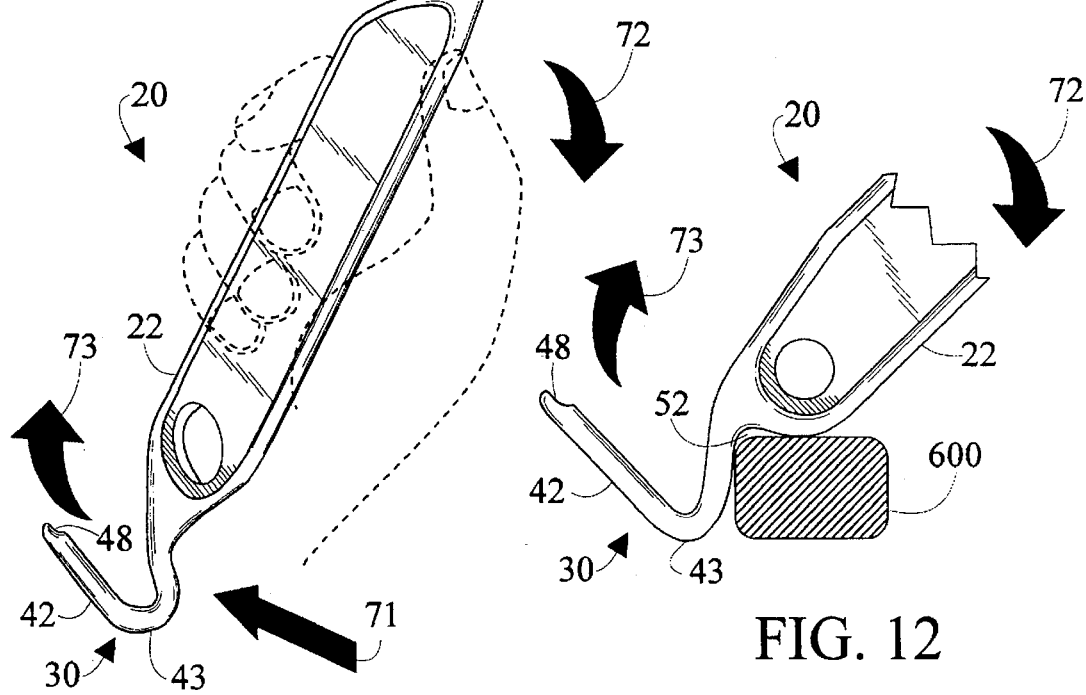

TOOL FOR CLEANING THE HOOVES OF THE EQUINE SPECIES AND METHOD OF USE

TECHNICAL FIELD

The present invention pertains to tools for the care and cleaning of the hooves of the equine species, and more particularly to an improved tool and method of use having a pick member and a blade member for effecting the cleaning operation.

BACKGROUND ART

The hooves of the equine species such as horses, ponies, burrows, mules and the like require daily care and cleaning in order to minimize the threat of infection or injury. This task is complicated by modern day farrier methods, which for medical purposes, are designed to correct lameness, but also can inhibit the cleaning process. Veterinary prescriptions now call for corrective shoeing, special horseshoes, and new trimming methods. As a direct result of these innovations, today's animals can encounter hoof care and cleaning problems that were unknown in the past.

In the past 100 years the technology of the farrier art has changed dramatically. Yet with all these advances in knowledge and technology, no corresponding advances have been made to the tools the owner must use to clean hooves to which special veterinary prescriptions or farrier methods have been applied. For example, U.S. Pat. No. 544,540 to Jones discloses a foot hook for horses which is used for cleaning dirt from the outside and bottom of the hoof. A hook is used for picking out the dirt about the frog and the cracks of the hoof, a knife is used for veterinary purposes, and a screwdriver edge for general farrier use. The hook of Jones cannot be effectively used for the care and cleaning the hooves of the modern equine species that have corrective shoeing such as pads, rim-pads, wedges, egg bar shoes, reverse shoes, etc. installed. It would be mechanically impossible for this prior art to remove debris from the small spaces and crevices that are blocked by special corrective devices. Further, the hook of Jones is sharp, and could therefore easily injure the animal or user if used inappropriately by non-professionals.

Other hoof cleaning tools are currently available on the market. These basically consist of a screwdriver blade which is attached to a handle. These too are ineffective in cleaning hooves having special corrective devices. They are badly balanced and awkward to use, and many have sharp edges that can damage the animal's hooves or even inflict injury to the handler of the tool. Due to the improper design of these existing products, cleaning takes both a long time and is ineffective.

DISCLOSURE OF INVENTION

The present invention is directed to a tool for cleaning the hooves of the equine species and method of use. The invention is well balanced and is designed to fit, and be easily manipulated by, the human hand. The design of the present invention allows the effective cleaning of all debris from the animal's hooves regardless of the type of special horseshoes or other corrective devices that are applied, and may be utilized on barefoot animals as well. The present invention offers a simple, safe, and effective tool which can easily be used by novice or professional alike.

In accordance with a preferred embodiment, the tool includes an elongated handle sized to be grasped by a human hand. A pick member is integral with one end of the handle, and a blade member is integral with the other end.

In accordance with an important aspect of the invention, the tool has a substantially flat I-beam shaped cross section that resists rotation when grasped by a hand.

In accordance with an important feature of the invention, the pick member includes an extending segment angularly connected to an end segment forming a heel therebetween, the end segment is oriented substantially perpendicular to the handle.

In accordance with another important aspect of the invention, the end segment includes an end portion having a shovel-shaped indentation.

In accordance with an important feature of the invention, the blade member includes a longitudinal shaft segment which projects outwardly from and is substantially parallel to the handle, and a hook integral with the end of the shaft segment.

In accordance with another preferred embodiment of the invention, the end portion of the pick member and the tip of the blade member are blunted to prevent injury to the animal and the user.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 1 is a side view of a tool for cleaning the hooves of the equine species in accordance with the present invention;

FIG. 2 is a bottom view of the tool of FIG. 1;

FIG. 3 is an enlarged cross sectional view along the line 3—3 of FIG. 2;

FIG. 4 is an enlarged cross sectional view along the line 4—4 of FIG. 2;

FIG. 10 is a perspective view of the pick member being used in a pulling action;

FIG. 11 is a perspective view of the pick member being used in a prying action;

FIG. 12 is fragmented cross sectional view of the pick member being used in a prying action;

MODES FOR CARRYING OUT THE INVENTION

Figure 5:
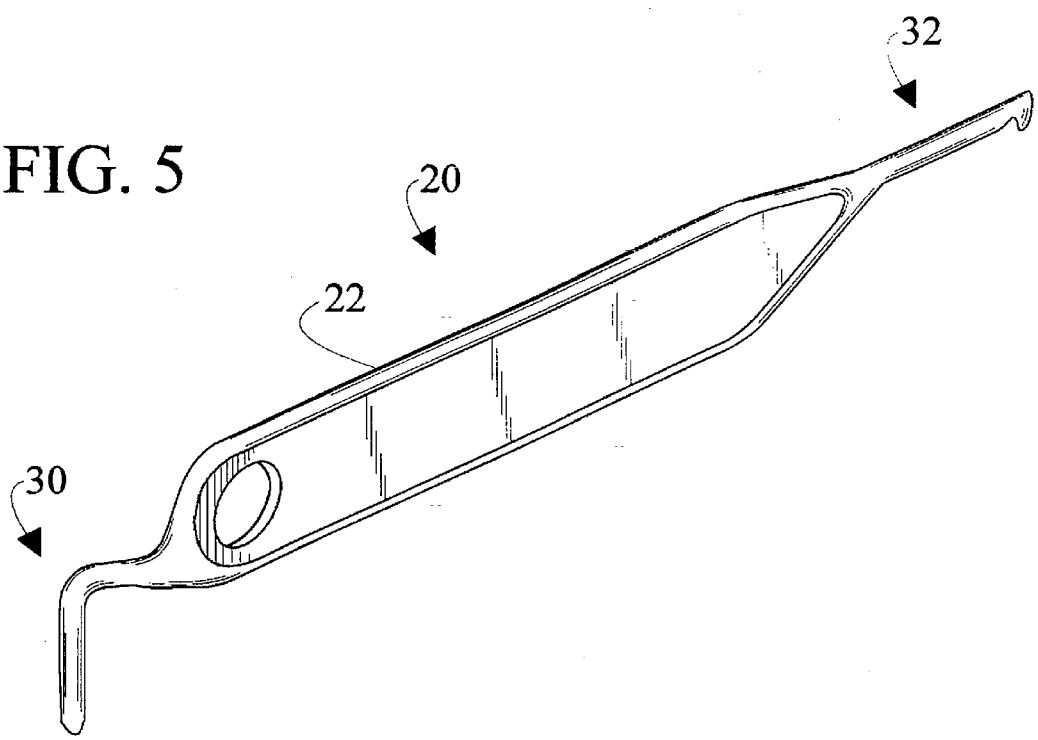
FIG. 5 is a perspective view of the tool.

Referring initially to FIG. 1, there is illustrated a side view of a tool for cleaning the hooves 500 (refer to FIG. 6) of the equine species in accordance with the present invention, generally designated as 20. The tool 20 includes an elongated handle 22 sized to be grasped by a human hand, the handle 22 has a first end 24 and an opposite second end 26.

In a preferred embodiment handle 22 is straight and longitudinally oriented along a first axis 28. Handle 22 could also be angled or curved so long as it can be conveniently grasp by a human hand. A pick member 30 is integral with first end 24, and a blade member 32 is integral with second end 26. The tool 20 has a substantially flat cross section thereby resisting rotation when grasped by the hand, the cross section defining a plane 34 (refer to the edge view of FIG. 3).

Pick member 30 further includes an extending segment 36 having a first end 38 and an opposite second end 40. First end 38 is connected to first end 24 of handle 22, and second end 40 is angularly connected to an end segment 42 forming heel 43 therebetween. During use, heel 43 can be placed in contact with the hoof 500 to act as a fulcrum which provides the leverage necessary to lift and pry out and remove debris quickly and efficiently. In a preferred embodiment, extending segment 36 has a first length L1 of about one inch, and end segment 42 has a second length L2 of about one and one-quarter inches. Extending segment 36 and end segment 42 are substantially coplanar with plane 34. End segment 42 is oriented along a second axis 44 which is substantially perpendicular to first axis 28. In a preferred embodiment, end segment 42 has a substantially circular cross section having a diameter D1 of about one-eighth of an inch. While in the preferred embodiment end segment 42 has a substantially circular cross section, other cross sections such as rectangular or oval could also be employed. End segment 42 also includes an end portion 46 having a shovel-shaped indentation 48 which faces handle 22. Shovel-shaped indentation 48 acts as a miniature shovel which enables pick member 30 to enter a debris packed hoof, penetrate the debris without risk of injury to the animal's delicate hoof 500, and scoop out the debris material. End portion 46 has a blunted tip 50 with no sharp edges or points. This safety feature prevents the hoof 500 or the user from being injured during the cleaning operation. Extending segment 36 and handle 22 form recess 52. Extending segment 36 is located between recess 52 and end segment 42.

Blade member 32 further includes a longitudinal shaft segment 54 having a first end 56 and an opposite second end 58. First end 56 is connected to second end 26 of handle 22 so that shaft segment 54 projects outwardly from handle 22 and is substantially parallel to first axis 28. To add mechanical strength, second end 26 of handle 22 is tapered to connect to shaft segment 54. A taper angle 55 of about 13° has been found useful. A hook 60 is connected to second end 58 of longitudinal shaft segment 54. Hook 60 defines mouth 62 which opens toward handle 22 and is substantially coplanar with plane 34.

In a preferred embodiment, longitudinal shaft segment 54 has a third length L3 of about one inch, and hook 60 has a fourth length L4 of about one-quarter of an inch. And, longitudinal shaft segment 54 and hook portion 60 have a substantially common width W1 sized to permit longitudinal shaft segment 54 and hook 60 to enter narrow crevices in the hoof 500 of the animal (refer to FIG. 6), and in between the hoof 500 and the shoe 600 (refer to FIGS. 7–9). In a preferred embodiment, W1 is about 0.085 inches measured perpendicular to plane 34 (refer to FIG. 2). Hook 60 also has a blunted tip 64 with no sharp edges or points. This safety feature prevents the hoof 500 or the user from being injured during the cleaning operation. Hole 61 in handle 22 provides a convenient way to hang tool 20 for storage. Hole 61 is preferably located near first end 24.

FIG. 2 is a bottom view of the tool of FIG. 1 showing handle 22, edge view of plane 34, and width W1.

FIG. 3 is an enlarged cross sectional view along the line 3—3 of FIG. 2. The substantially flat cross section of handle 22 is I-beam shaped, and resultantly tool 20 has the maximum strength using a minimal amount of manufacturing material. The I-beam shaped construction results in strength for long wear and service, light weight in the hand, and a comfortable grasping surface. In terms of construction, tool 20 may be forged, welded, stamped, coined, molded, or cast. Tool 20 may be fabricated from numerous metals such as steel, brass, stainless steel, bio-steel, cold-rolled steel, aluminum, or tool steel. Tool 20 could also be fabricated from a durable plastic, or from a combination of metal and plastic. The finish may be polished, unpolished, of black oxide, or coated in plastic or rubber.

FIG. 4 is an enlarged cross sectional view along the line 4—4 of FIG. 2 showing longitudinal shaft portion 54 and hook portion 60 of blade member 32.

FIG. 5 is a perspective view of the tool 20 showing handle 22, pick member 30 and blade member 32.

Figure 6:
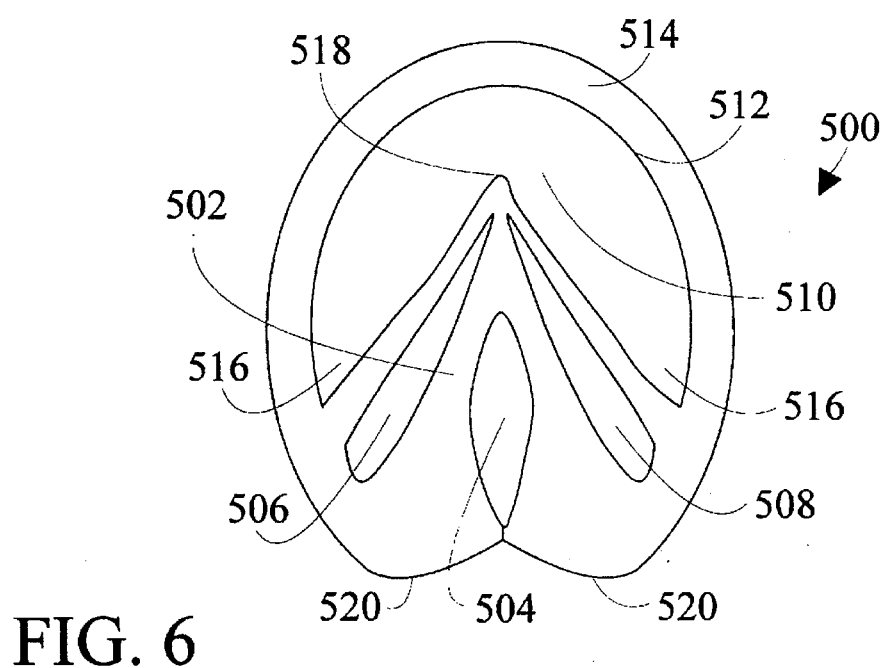
FIG. 6 is a plan view of the bottom of a barefoot hoof.

FIG. 6 is a plan view of the bottom of a barefoot hoof 500 showing the frog 502, the central cleft 504, the left side cleft 506, the right side cleft 508, the sole 510, the white line 512, the wall 514, the seat of the corn 516, the point of the frog 518, and the heel 520. The tool 20 (refer to FIGS. 1–4) is used for cleaning the hooves 500 of the equine species by grasping tool 20 in the hand and first using the pick member 30 to remove larger portions of debris from the frog 502, central cleft 504, left and right side clefts 506 and 508, the sole 510, the white line 512, the seat of the corn 516, the point of the frog 518, and the heel 520. Since handle 22 is flat, it will not spin or turn in the hand while being grasped by the user. Shovel-shaped indentation 48 in end portion 46 acts as a miniature shovel which enables pick member 30 to enter a debris packed hoof 500, penetrate the debris without risk of injury to the animal's delicate hoof 500, and scoop out the debris material. Heel 43 acts as a fulcrum and provides the leverage necessary to lift and remove debris quickly and efficiently. Once the major portions of the debris have been removed, end portion 46 having shovel-shaped indentation 48, is used to remove the smaller, finer amounts of debris that are packed into the delicate frog 502, point of the frog 518, and left and right side cleft areas 506 and 508. Turned sideways end segment 42 can be used to easily scrape the sole 510 clean with no risk of injury to the hoof 500. After using the pick member 30, the tool 20 is simply longitudinally rotated in the hand to initiate use of blade member 32 to remove debris from small crevices, particularly those resulting from the attachment of a horseshoe.

Figure 7:
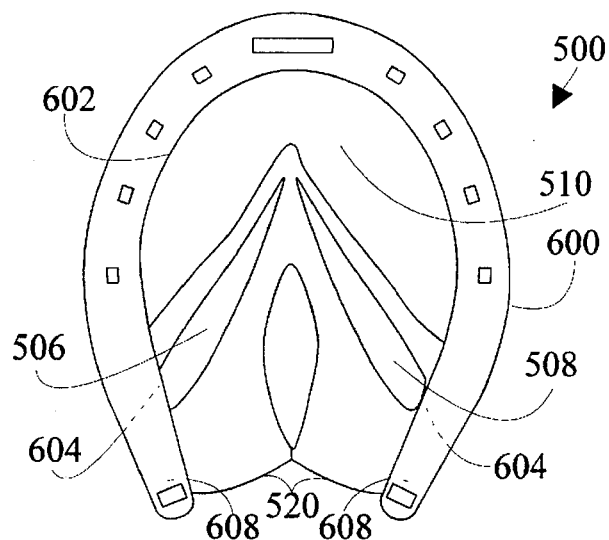
FIG. 7 is a plan view of the bottom of a hoof having a shoe attached.

FIG. 7 is a plan view of the bottom of a hoof 500 having a shoe 600 attached. Pick member 30 (refer to FIGS. 1–4) is used to clean the sole 510 as well as around the inside 602 of the shoe 600. However, due to the presence of the shoe 600, certain areas of the hoof 500, particularly the small crevices between the hoof 500 and the shoe 600, are inaccessible to the larger pick member 30, and also to any other hoof cleaning tool currently on the market. This is especially true for corrective or special shoes such as reverse shoes (refer to FIG. 8), egg bars (refer to FIG. 9), shoes with trailers, clamp-ons, and the like, and also for additional devices such as rim-pads, concussion pads, wedges, etc. Blade member 32 makes it possible to clean the small crevices of the hoof 500 even when the animal is wearing special shoes 600 or other devices. The smallness of blade member 32 enables cleaning in areas which are not accessible by other cleaning tools. Utilizing blade member 32, the user is able to get underneath and/or in between the shoes 600 (and perhaps pads) which block access to the left and right side clefts 506 and 508 and remove bacterial debris from areas 604 and 606 which can compromise the benefit gained by the special shoes 600 or other corrective devices. Blade member 32 is equally well adapted to remove debris from in between the shoe 600 and the heel 520 in areas 606. The mouth 62 of hook 60 permits hook 60 to engage debris, such as a small rock, and then be used to dislodge the debris by pulling it toward the user.

Figure 8:
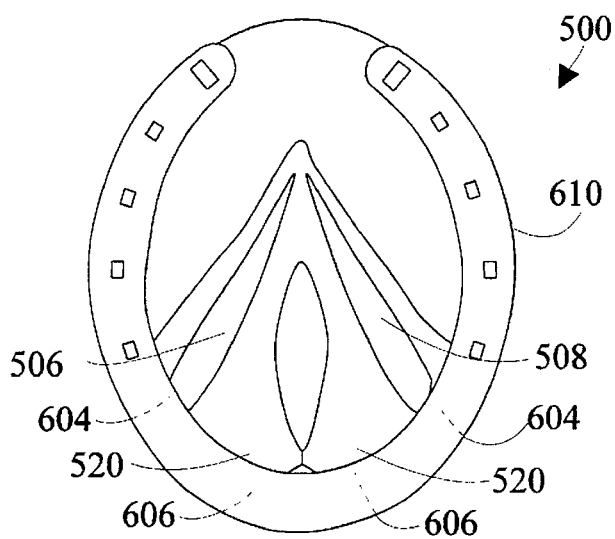
FIG. 8 a plan view of the bottom of a hoof having a reverse shoe attached.

FIG. 8 a plan view of the bottom of a hoof 500 having a reverse shoe 610 attached. In this instance, reverse shoe 610 covers heel 520, and debris can become lodged in the left and right side clefts 506 and 508 as well as in between reverse shoe 610 and heel 520. Blade member 32 (refer to FIGS. 1–4) can be used to effectively remove debris from these areas 604 and 606.

Figure 9:
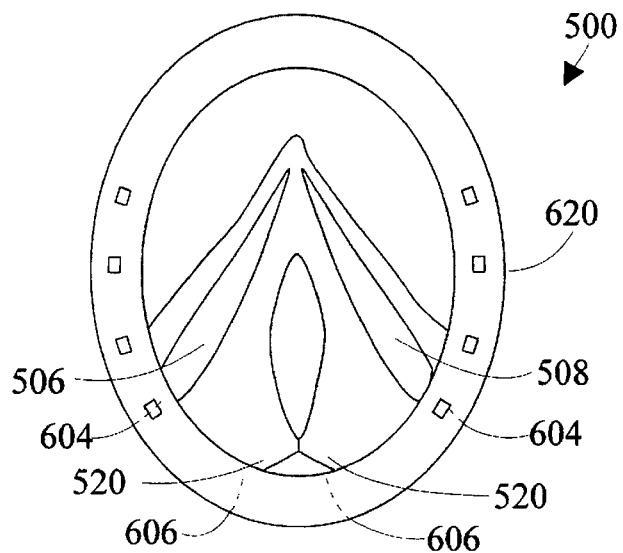
FIG. 9 is a plan view of the bottom of a hoof having an egg bar shoe attached.

FIG. 9 is a plan view of the bottom of a hoof 500 having an egg bar shoe 620 attached. As was the case for reverse shoe 610, blade member 32 (refer to FIGS. 1–4) can be used to effectively remove debris from areas 604 and 606.

FIG. 10 is a perspective view of the tool 20 being grasped by a human hand so that pick member 30 may be used in a pulling action. The substantially flat tool 20 is held in the palm of the hand with the three fingers surrounding handle 22 so that handle 22 is firmly held in place and resists any tendency to rotate around first axis 28. The index finger is placed along the top of handle 22 and serves as a guide. In a preferred embodiment, pick member 30 is pulled in direction 70 with end segment 42 engaging and removing debris from the hoof.

FIG. 11 is a perspective view of the pick member 30 being used in a prying action. The tool 20 is held with handle 22 braced against the heel of the hand. The pick member 30 is inserted into a pocket of debris in direction 71. The tool 20 is then rotated in direction 72 in a prying action with heel 43 serving as a fulcrum. Debris is dislodged in direction 73 by end segment 42 and shovel-shaped indentation 48.

FIG. 12 is a fragmented cross sectional view of the pick member 30 being used in a prying action. Recess 52 provides clearance around an obstacle such as a horseshoe 600 when effecting the prying operation.

Figure 13:
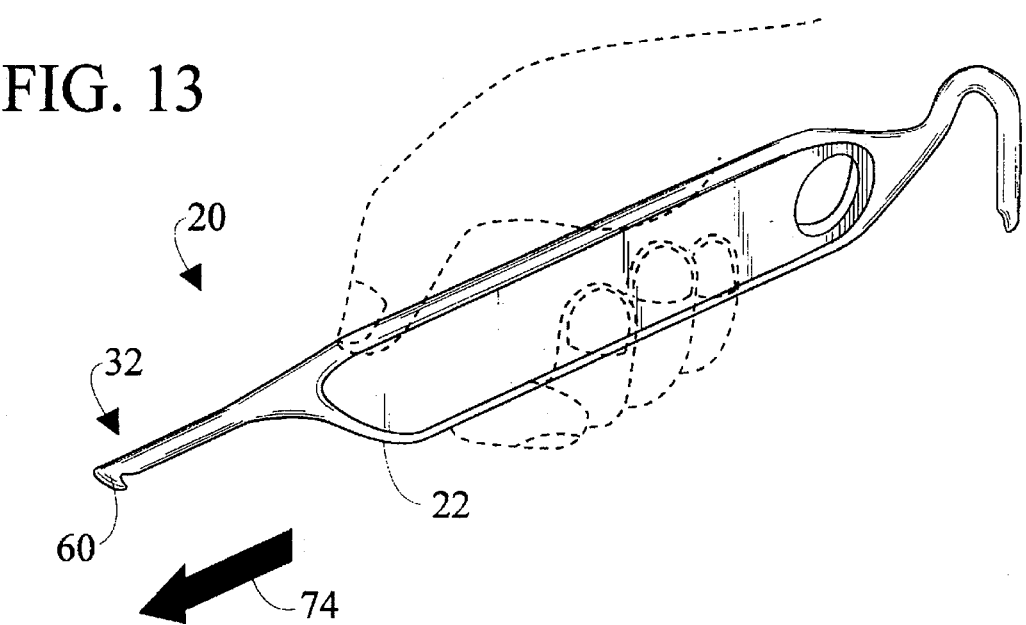
FIG. 13 is a perspective view of the blade member being used in a pushing action; and, FIG. 14 is a perspective view of the blade member being used in a pulling action.

FIG. 13 is a perspective view of blade member 32 being used in a pushing action. The substantially flat tool 20 is held in the palm of the hand with all four fingers surrounding handle 22 so that handle 22 is firmly held in place and resists any tendency to rotate. In a preferred embodiment, blade member 32 is pushed in direction 74 with hook 60 engaging and removing debris from the hoof, or from between the hoof and a horseshoe or pad.

Figure 14:
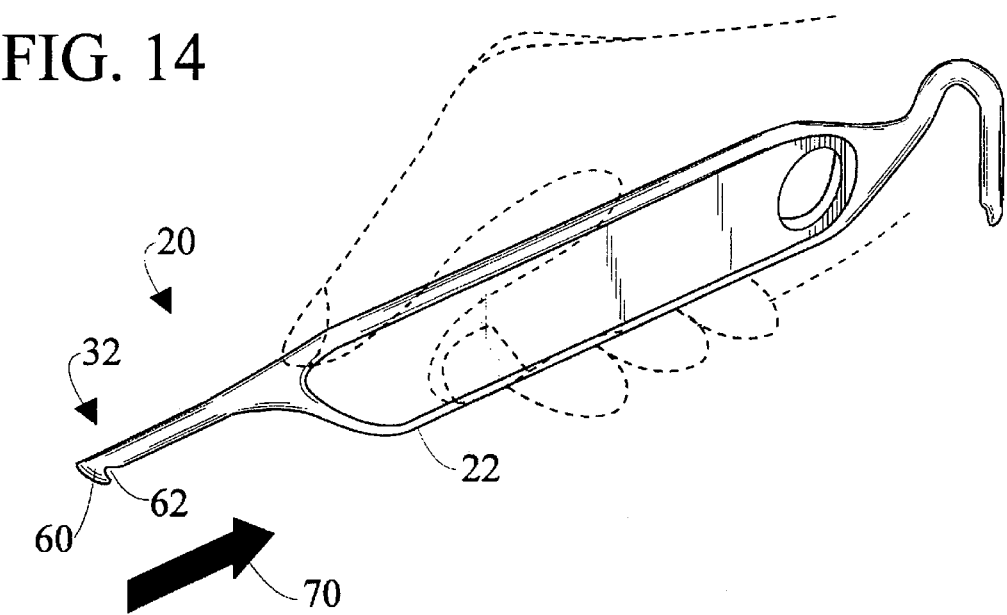

FIG. 14 is a perspective view of the blade member being used in a pulling action. Tool 20 is held in the palm of the hand with the three fingers surrounding handle 22 so that handle 22 is firmly held in place and resists any tendency to rotate. The index finger is placed along the top of handle 22 and serves as a guide. Blade member 32 is pulled in direction 70 with hook and mouth 62 engaging and removing debris from the hoof, or from between the hoof and a horseshoe or pad.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A tool for cleaning the hooves of the equine species comprising:

an elongated handle sized to be grasped by a human hand, said handle having a first end and an opposite second end, said handle oriented along a first axis;

a pick member integral with said first end;

a blade member integral with said second end;

said handle having a substantially flat cross section thereby resisting rotation when grasped by the hand, said flat cross section defining a plane; and, said substantially flat cross section being I-beam shaped.

2. A tool for cleaning the hooves of the equine species comprising:

an elongated handle sized to be grasped by a human hand, said handle having a first end and an opposite second end, said handle oriented along a first axis;

a pick member integral with said first end;

a blade member integral with said second end;

said handle having a substantially flat cross section thereby resisting rotation when grasped by the hand, said flat cross section defining a plane;

said pick member further including an extending segment having a first end and opposite second end, said first end connected to said first end of said handle, and said second end angularly connected to an end segment forming a heel therebetween, said extending segment and said end segment substantially coplanar with said plane, said end segment having a cross section which is one of circular and oval; and, said end segment having an end portion having a shovel-shaped indentation.

3. A tool for cleaning the hooves of the equine species comprising:

an elongated handle sized to be grasped by a human hand, said handle having a first end and an opposite second end, said handle oriented along a first axis;

a pick member integral with said first end;

a blade member integral with said second end;

said handle having a substantially flat cross section thereby resisting rotation when grasped by the hand, said flat cross section defining a plane; and, said blade member further including a longitudinal shaft segment having a first end and an opposite second end, said first end connected to said second end of said handle, said shaft segment projecting outwardly from said handle and substantially parallel to said first axis, said second end of said shaft segment connected to a hook, said hook defining a mouth which opens toward said handle and is substantially coplanar with said plane, said longitudinal shaft segment and said hook substantially coplanar with said plane.

4. A tool according to claim 3, said longitudinal shaft segment having a third length of about one inch.

5. A tool according to claim 3, said hook having a fourth length of about one-quarter of an inch.

6. A tool according to claim 3, said longitudinal shaft segment and said hook have a substantially common width measured perpendicular to said plane, said width being about 0.085 inches.

7. A tool according to claim 3, said hook having a blunted tip.

8. A tool for cleaning the hooves of the equine species comprising:

an elongated handle sized to be grasped by a human hand, said handle having a first end and an opposite second end, said handle oriented along a first axis;

a pick member integral with said first end;

a blade member integral with said second end;

said handle having a substantially flat cross section thereby resisting rotation when grasped by the hand, said flat cross section defining a plane;

said handle having a substantially flat I-beam shaped cross section thereby resisting rotation when grasped by the hand;

said pick member further including an extending segment having a first end and opposite second end, said first end connected to said first end of said handle, and said second end angularly connected to an end segment forming a heel therebetween, said extending segment and said end segment substantially coplanar with said plane;

said end segment oriented along a second axis, said second axis substantially perpendicular to said first axis;

said end segment having an end portion having a shovel-shaped indentation;

said end portion having a blunted tip;

said extending segment and said handle forming a recess therebetween, said extending segment disposed between said recess and said end segment;

said blade member further including a longitudinal shaft segment having a first end and an opposite second end, said first end connected to said second end of said handle, said shaft segment projecting outwardly from said handle and substantially parallel to said first axis, said second end of said shaft segment connected to a hook, said hook defining a mouth which opens toward said handle and is substantially coplanar with said plane, said longitudinal shaft segment and said hook substantially coplanar with said plane;

said longitudinal shaft segment and said hook have a substantially common width measured perpendicular to said plane; and, said hook having a blunted tip.

* * * * *